April 21, 1959
H. KLAUE
2,883,007
DISK BRAKES
Filed Dec. 23, 1955
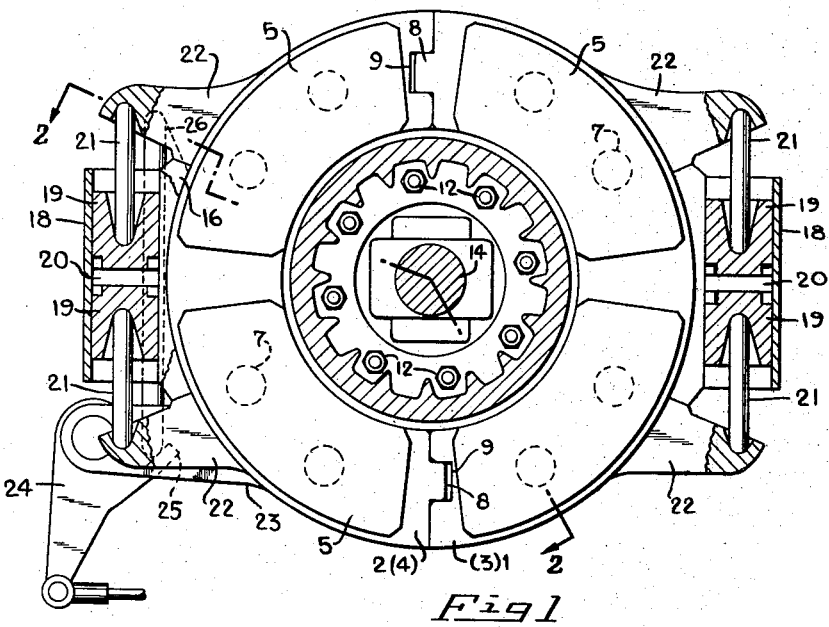
Fig 1
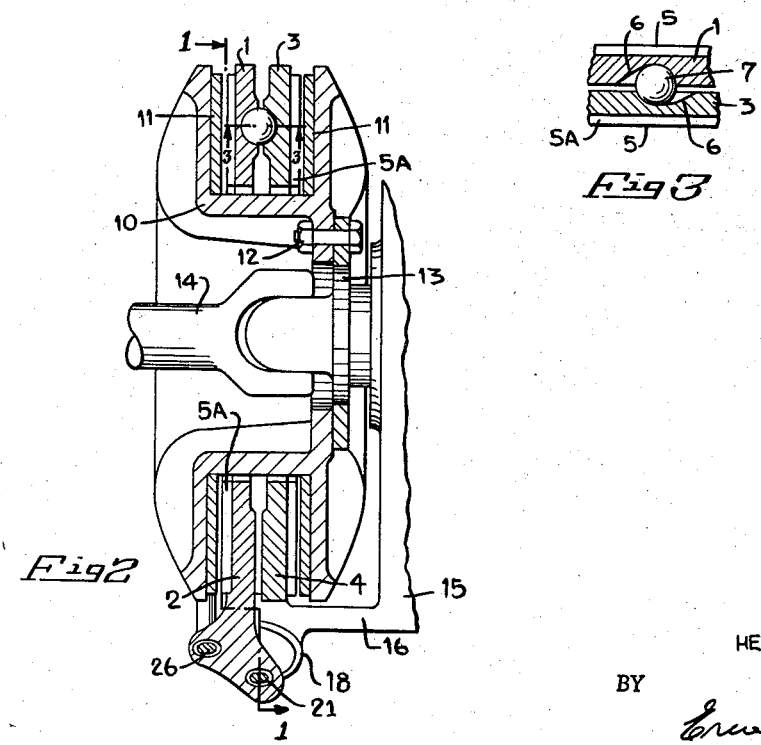
Fig 2
Fig 3
INVENTOR:
HERMANN KLAUE,
BY
HIS ATTORNEY.

United States Patent Office 2,883,007
Patented Apr. 21, 1959

2,883,007

DISK BRAKES

Hermann Klaue, Ueberlingen (Bodensee), Germany, assignor to Moritz Straus, Zurich, Switzerland Application December 23, 1955, Serial No. 555,168

Claims priority, application Germany January 7, 1955

2 Claims. (Cl. 188—72)

The present invention relates to disk brakes, and more particularly to a disk brake actuated by air or liquid pressure.

Disk brakes of this kind are known in the art having a revolving brake casing and two brake discs supported movably in axial direction on a stationary brake support. The brake disks are provided on their outer side with a brake lining and on the inner sides with recesses arranged oppositely to each other which have inclined surfaces rising in the circumferential direction and in which balls are supported by which the two brake disks are connected with each other. Each brake disk is freely movable in one direction of rotation. When the two brake disks are rotated against each other in the circumferential direction they are pressed against the revolving brake casing. The mutual rotation of the brake disks is effected by means of two pistons of a common brake cylinder, said pistons being directed oppositely to each other and mechanically coupled with said disks, respectively.

The present invention has the task of further developing such disk brakes, to increase the braking areas thereof, and to reduce the consumption of energy which is needed for actuating the same.

The solution of this task according to the present invention consists in that the rotating brake casing is formed so as to be open toward the outside and the axial driving casing serving as brake carrier is provided at two diametrically opposite sides with projections extending over and beyond the brake casing, said brake cylinders being supported by said projections. By this arrangement of the brake cylinders the braking surfaces of the disk brakes may be made relatively large because the inner diameter of the annular brake disks is not required for accommodating the brake cylinders. Since the pistons of the brake cylinders attack at the outer perimeter of the brake disks, a relatively low force is required for the mutual rotation of the two brake disks.

If desired, the brake casing may be made from a single cast piece according to a further development of the present invention. Thus the cross section of the brake casing is U-shaped being open towards the outside. This design of the casing is very advantageous thermically and from the point of view of the manufacture thereof. However, each brake disk has to be subdivided in this case into two segments interlocking by means of projections and correspondingly shaped recesses.

Further details of the invention may be derived from the following detailed description of an embodiment with respect to the Figures 1–3 of the drawings.

In the drawings,

Fig. 1 is a section along the line 1—1 of Fig. 2 vertically to the braking axle, Fig. 2 is a cross section taken along the line 2—2 of Fig. 1, and Fig. 3 is a partial section of the two brake disks taken along the line 3—3 shown in Fig. 2.

Referring now to the drawings, 1 and 2 denote the two segments of the one brake disk, and 3 and 4 denote the segments of the other brake disk. All brake disk segments are provided with brake linings 5 applied in individual pieces. The grooves 5A left free between the brake linings serve for collecting and carrying off the dust abraded from the segments. The segments of the brake disks are provided with recesses 6 rising in circumferential direction. In these recesses are supported balls 7 through which the brake disk segments 1 and 3 as well as 2 and 4 are connected with one another.

The brake disk segments are provided at one face with projections 8 and at other face with correspondingly shaped recesses 9. The brake disks are freely movable in axial direction and supported by the brake casing 10 preferably consisting of light metal or alloy and being provided with ribs. Counterdisks 11 for the brake disk segments 1, 2, 3 and 4 preferably made from gray cast iron are cast into the brake casing 10. In the embodiment shown in the drawings the brake casing 10 is attached by means of screws 12 to a flange 13 rotating together with the driving shaft 14. With the casing 15 of the driving axle are connected projections 16 and 17 serving as brake carriers transferring the brake torque. Each brake disk is arranged immovably in one circumferential direction and freely movably in the opposite circumferential direction.

The projections 16 and 17 of the casing 15 driving the axle carry brake cylinders 18. In each of these brake cylinders 18, there are supported two hydraulic pistons 19. When a brake actuating means such as oil is pressed into the pressure chamber 20 of the brake cylinder 18 the pistons 19 press over the push rods 21 projections 22 of the brake disks or the segments thereof so as to exert in this manner over the pressure balls 7 a pressing of the brake linings 5 of the segments 1, 2, 3 and 4 against the disks 11 cast in one piece with the rotating brake casing 10.

If the disk brake is to be mechanically actuated an extension 23 cast in one piece with the segment 2 may be provided, a brake lever 24 being supported by the extension 23. If the brake is to be actuated the brake lever 24 presses through an extension 25 and a push rod 26 against the projection 22 of the segment 4, thus causing a rotation of the two brake disks against each other which has as a consequence the running up of the balls 7 on the inclined surfaces of the recesses 6 so that the brake disk segments are pressed against the rotating brake casing 10.

It will be apparent to those skilled in the art that the novel principles of the invention disclosed herein in connection with specific exemplification thereof will suggest various other modifications and applications of the same. It is accordingly desired that in construing the breadth of the appended claims they shall not be limited to the specific exemplification of the invention described herein.

What I claim is:

1. A pressure fluid actuated disk brake, comprising, in combination, a revolving brake casing forming a U-shaped structure open at the external orbit, a stationary brake carrier arranged in said structure inside the orbit of said brake casing, two brake disks arranged axially movably with respect to said brake carrier, said brake disks having at the outer face thereof a brake lining and having on the inner face thereof inclined surfaces arranged opposite to each other and rising in circumferential direction, balls arranged on said inclined surfaces, each of said brake disks being freely movable in one direction of rotation oppositely relative to that of the other, said brake disks being pressed from each other by the interactions of said balls and inclined surfaces, upon a mutual rotation, axially against said brake casing, a brake cylinder supported against rotation, two pistons arranged in said brake cylinder, said pistons being mechanically coupled with said brake disks and operable to turn said disks about the axis simultaneously in opposite directions, and a projection provided on said brake carrier, said projection being formed so as to project beyond the external orbit of the structure of said brake casing, said projection being in operative connection with said brake cylinder.

2. A pressure fluid actuated disk brake, comprising in combination, a revolving brake casing forming a U-shaped structure open at the external orbit, a stationary brake carrier arranged in said structure inside the orbit of said brake casing, two brake disks arranged axially movably with respect to said brake carrier and having at the outer face a brake lining and having on the inner face inclined surfaces arranged opposite each other and rising in circumferential direction, balls arranged on said inclined surfaces, each brake disk being freely movable in one direction of rotation oppositely relative to that of the other brake disk, said brake disks being pressed from each other axially against said brake casing by the interactions of said balls and inclined surfaces, upon a mutual rotation, two oppositely disposed brake cylinders each supported against rotation, two pistons arranged in each brake cylinder and being mechanically coupled with said brake disks and operable to turn said disks about the axis simultaneously in opposite directions, and two projections provided on said brake carrier at two diametrically opposite sides and formed so as to project beyond the external orbit of the structure of said brake casing, each projection being in operative connection with a brake cylinder.

References Cited in the file of this patent

UNITED STATES PATENTS

| | | |
|---|---|---|
| 1,777,462 | Christensen | Oct. 7, 1930 |
| 2,237,624 | Oldham | Apr. 8, 1941 |
| 2,387,039 | Parrett | Oct. 16, 1945 |
| 2,732,036 | Myers | Jan. 24, 1956 |

FOREIGN PATENTS

| | | |
|---|---|---|
| 969,682 | France | Mar. 31, 1950 |